Patented May 3, 1932

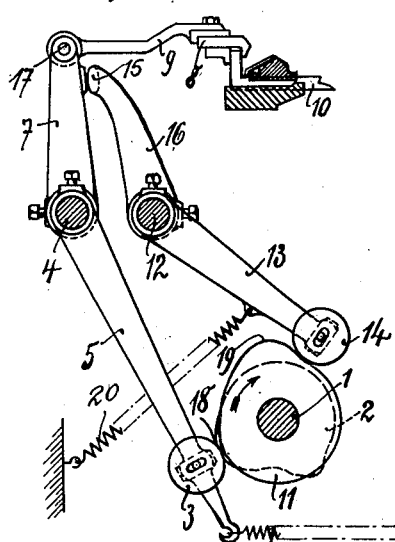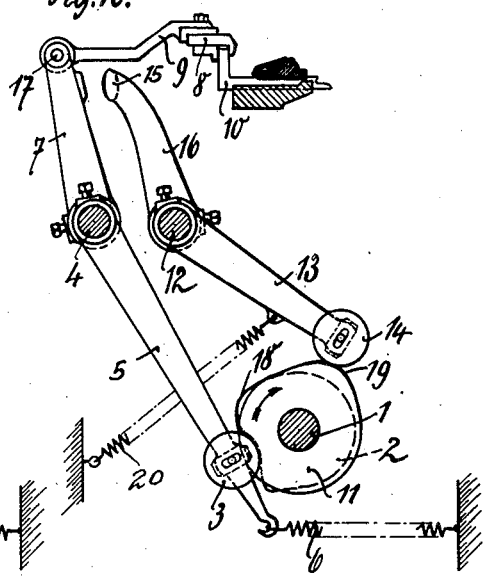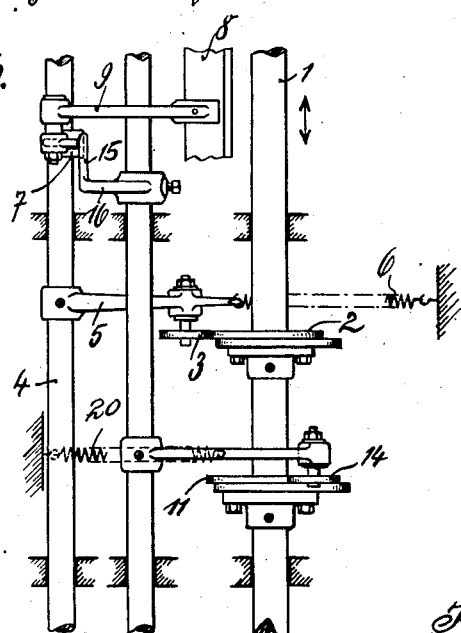

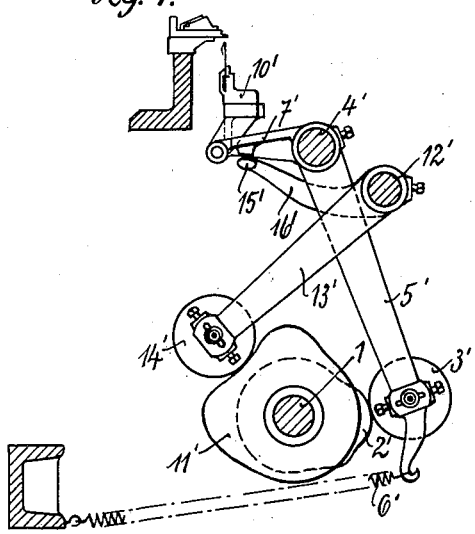
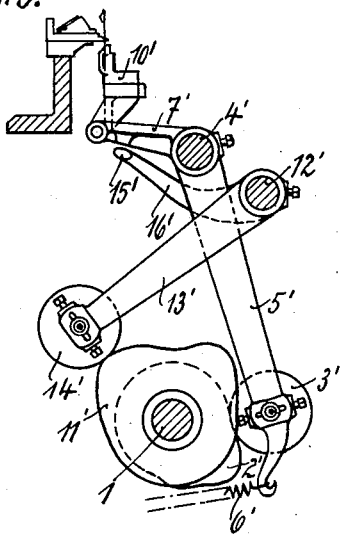
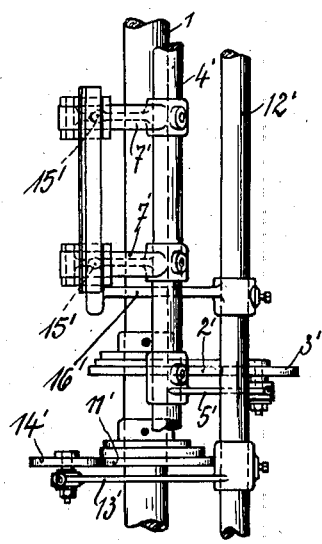

1,857,099

UNITED STATES PATENT OFFICE

PAUL LIEBERKNECHT, OF EINSIEDEL, NEAR CHEMNITZ, GERMANY, ASSIGNOR OF ONE-HALF TO MASCHINENFABRIK-EINSIEDEL, GESELLSCHAFT MIT BESCHRANKTER HAFTUNG, OF EINSIEDEL, NEAR CHEMNITZ, GERMANY

VIBRATION FREE DRIVE FOR SHAFT AND CAM ACTUATED MEMBERS OF FLAT-FULL FASHIONED MACHINES

Application filed November 11, 1931, Serial No. 574,394, and in Germany July 9, 1930.

This invention relates to a driving device for the shaft, cam and lever actuated members in flat-full fashioned machines, in particular for the facing bar and needle bar. The hitherto known devices for this purpose consist of a shaft on which there are levers with rollers running on cams and furthermore levers which transmit the movements caused by the cams to the members to be actuated, for example the facing bar and the needle bar. It is not possible, when using these devices to avoid the creation of vibrations owing to the always considerable lengths of the levers and the very short reversing movements which at times occur at the places where the movement and force are imparted to the members. These vibrations act detrimentally on the formation of the goods. This disadvantage is noticeable particularly in high speed machines.

The object of this invention is to eliminate this defect. According to the invention this object is attained in that the known system of shafts cams and levers which effect a to-and-fro motion of the facing bar or the needle bar or both members on movement of these members to their force and movement imparting position lays itself against an abutment which is movable in the same direction and is supported in its reverse movement by a force which acts directly or indirectly at the same place.

The said abutment prevents the levers which actuate the corresponding members from swinging too far at the places where they transfer the movement shortly before the commencement of their reverse movement, owing to the kinetic energy stored in them and to vibration, whilst the additional force which becomes active during the return movement of these levers effects a quicker counteraction of the inertias of the levers and counteracts so strongly thereon dependent vibrations due to springing of the levers and taking place immediately after the reverse movement commences, that the vibrations can no longer act deleteriously on the members actuated by the levers or on the formation of the goods.

The construction of an arrangement of this kind can vary. One construction consists, according to the present invention in that a second system of levers with cams is provided which serves as a movable support for the known system after completed forward movement thereof and at the same time supports the return movement of this known system which thereupon commences.

In the accompanying drawings the above defined embodiment is illustrated as an example for the movement of the facing bar and for the movement of the needle bar. In the drawings Figure 1 shows in front view the new device for movement of the facing bar at the moment of reversal.

Figure 2 shows the same device in the same view, with the facing bar in the rearmost position.

Figure 3 shows the parts according to Figure 1 in plan view.

Figure 4 shows in front view the new device for movement of the needle bar, at the moment of reversal.

Figure 5 shows the same device in the same view at the moment that the movement of the needle bar has ended.

Figure 6 shows the parts according to Figure 4 in plan view.

Referring to the drawings, a cam 2 amongst other things, is secured on the changing shaft 1, and has rolling on its periphery a roller 3 which is carried by a lever 5 secured on a shaft 4 and drawn constantly towards the cam 2 by a spring 6. Secured on the shaft 4 there is also an upwardly extending lever 7 which transmits to an arm 9 connected to the facing bar 8 the oscillatory movement imparted to it by the previously stated parts and thereby moves the sinker 10 to and fro. This described driving arrangement is known.

A second cam 11 is secured to the shaft 1 and has riding on it a roller 14 which is carried by a lever 13 which is secured to a shaft 12. These parts set into oscillatory motion a lever 16 which is secured on the shaft 12, extends upwardly and is provided with an offset part 15.

The mode of operation is as follows:—According to the position shown in Figure 1, the sinker 10 is pushed by the known device consisting of the parts 1 to 9 into the foremost position, the uppermost lever 7 having given off to the arm 9 the movement and force imparted to it. In this position the offset part 15 of the arm 13 of the second lever system takes up a position in which it serves as an abutment for the first lever system. Before this the new arm 13 has performed a movement which is slower than but in the same direction as the old arm 7, the two movements ending at the same time at one and the same point. Consequently the old arm 7 under no circumstances can perform a further forward movement due to its unavoidable vibration and therefore the faults in the goods, hitherto arising therefrom cannot occur.

This disadvantage however was present also on the return movement of the sinker for the same reason and owing to the inertia of the parts forming the driving device, particularly in high speed machines. When the roller 3 of the old lever system has passed the reversal point 18 of its cam 2, the roller 14 of the second lever system which commenced to ride up towards the cam point 19 before the roller has passed the reversal point 18, continues to ride up to the cam point 19. Thereby not only is the return movement of the old lever system supported, but in addition the detrimental effect of the coefficient of inertia on the formation of the goods is so weakened that the same practically can exercise no detrimental action on the formation of the goods. When the new roller 14 has passed the cam point 19 the lever 16 releases itself immediately from the lever 7 of the known lever system because a spring 20 constantly presses the new roller 14 against the new cam 11.

To secure the needle bar against deleterious vibration effects an identical or similar second system can be employed with similar effect as shown in Figures 4 to 6. The cam shaft 1 has a cam 2' on which rides a roller 3' carried by a lever 5' secured to a shaft 4'. The roller 3' is drawn constantly against the cam 2' by a spring 6'. A lever 7' is also secured to the shaft 4' and transmits to the needle bar 10' the swinging movement hitherto imparted to it by the old lever system, and so imparts to the needle bar the necessary upward and downward movement. All of the described mechanism is already known.

A second cam 11' is also secured to the shaft 1 and a roller 14' riding on it. The roller 14' is carried by a lever 13' which is secured to a shaft 12'. A lever 16' is also secured to the shaft 12 and has a wing 15'. In the position shown in Figure 4 the needle bar 10' has been brought into its lowest position by the known mechanism 1' to 9'. In order to arrest the heavy weight of the needle bar in its lowermost position of reversal without vibration, the lever 13' with its roller 14' had already commenced to ride up the cam 11' in order to participate in the last part of the downward movement of the needle bar in order to catch the heavy weight acting upon it by means of the wing 15' on the lever 16'. Thereupon the cam 11' again rises in order to support the outward movement of the needle bar. In consequence the lever 7' and the needle bar cannot under any circumstances be caused by the active forces existing therein to perform a further downward movement and thereby develop vibrations, because it is positively guided by the eccentric 11, and the parts 14', 13', 16' and 15'.

I claim—

1. A driving device for the actuation of the members driven by aid of shafts in flat-full fashioned machines, particularly the facing bar and needle bar, comprising a movable abutment which operates on the lever producing the forward and return movement of the said members at the position of the lever where it transmits movement and force and before the lever commences its return movement, and an additional force producing means which supports the lever in its return movement, whereby the vibration set up at these places at the moments of reversal is rendered non-deleterious.

2. A driving device for the actuation of the members driven by aid of shafts in flat-full fashioned machines comprising the usual system of levers with a cam and a second system of levers with cam which upholds the first named system at the end of its forward motion and also supports the following commencement of the return motion of the first named system.

3. A driving device for the actuation of the members driven through shafts in flat-full fashioned machines, comprising a lever system with cam and a swinging arm, and an additional lever system with cam and a swinging arm which catches up to the first named arm on the forward swing at a moment which is not later than that at which the first named arm has arrived at the final point of the intended forward movement.

In testimony whereof I affix my signature.

PAUL LIEBERKNECHT.